United States Patent
Krasinski et al.

(10) Patent No.: US 6,490,370 B1
(45) Date of Patent: Dec. 3, 2002

(54) SYSTEM AND METHOD FOR DESCRIBING MULTIMEDIA CONTENT

(75) Inventors: Raymond J. Krasinski, Suffern, NY (US); Yasser alSafadi, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/371,375

(22) Filed: Aug. 10, 1999

Related U.S. Application Data (60) Provisional application No. 60/117,657, filed on Jan. 28, 1999.

(51) Int. Cl.[7] .............................. G06K 9/00; G06K 9/46; G09G 17/00; H04N 1/00; G06F 17/30
(52) U.S. Cl. ...................... 382/195; 382/181; 382/190; 382/236; 382/305; 382/311; 345/418; 345/473; 345/706; 345/968; 358/403; 707/3; 707/102; 707/104.1; 707/501.1
(58) Field of Search ................................. 382/181, 190, 382/195, 236, 240, 276, 282, 305, 307, 309, 311, 306; 345/156, 418, 473, 475, 961, 968, 977, 706; 358/403; 348/469, 473; 707/1, 3, 4, 6, 100, 101, 102, 104.1, 500, 501.1, 513, 500.1

(56) References Cited

U.S. PATENT DOCUMENTS

| | | | |
|---|---|---|---|
| 5,655,117 A | * | 8/1997 | Goldberg et al. ............ 707/102 |
| 5,684,715 A | * | 11/1997 | Palmer ........................ 348/473 |
| 5,898,429 A | * | 4/1999 | Trom et al. ............... 707/500.1 |
| 6,070,167 A | * | 5/2000 | Qian et al. .................. 707/102 |
| 6,243,713 B1 | * | 6/2001 | Nelson et al. ........... 707/104.1 |

FOREIGN PATENT DOCUMENTS

WO    WO9617313    6/1996    ........... H05B/37/00

OTHER PUBLICATIONS

Kim, et al discloses "VIRON: An Annotation–Based Video Information Retrieval System", IEEE, pp. 298–303, 1996.*
Ferman, et al discloses "Effective Content Representation for Video", IEEE, pp. 521–525, Jan. 1998.*
Li, et al disclose "Multimedia Contents Description in the Infopyramid", IEEE, pp. 3789–3792, Jun. 1998.*
"Next Generation Network and Operating System Requirements for Continuous Time Media", Stevens, XP002001340, Lecture Notes in Computer Science, US, Jan. 1, 1992, pp. 197–208.
"OVID: Design and Implementation of a Video–Object Database System", Oomoto et al, XP–002134326, IEEE Transactions on Knowledge and Data Engineering, 8/93, Vo. 5, No. 4, pp. 629–643.

* cited by examiner

Primary Examiner—Leo Boudreau
Assistant Examiner—Daniel G. Mariam (57) ABSTRACT

A video processing device and method for generating a descriptor data structure representative of a feature that has been selected from among of plurality of features including visual, conceptual, textual and graphical of a visual animated data file includes a user input unit for selecting a desired feature and generating an associated descriptor data containing attribute values, and a processor identifies the selected feature inserts selected attribute values into a standard descriptor template. Various types of features, from concepts about a video sequence, to age identification, to images in a video clip, to particular objects or colors can all be classified in a standard descriptor template, to provide uniformity in storing and retrieving the various features currently lacking in freeform or single feature descriptors.

17 Claims, 5 Drawing Sheets

SYSTEM AND METHOD FOR DESCRIBING MULTIMEDIA CONTENT

CROSS-REFERENCE TO RELATED APPLICATIONS

The present invention is related to that disclosed in U.S. Provisional Patent Application No. 60/117,657, filed on Jan. 28, 1999, entitled "PROCESS FOR DESCRIBING MULTIMEDIA CONTENT," which is commonly assigned to the assignee of the present invention.

The disclosure of this related provisional patent application is incorporated herein by reference for all purposes as if fully set forth herein.

TECHNICAL FIELD OF THE INVENTION

The present invention is directed, in general, to video processing systems and more specifically, to a system for identifying and describing the content of visual animated data.

BACKGROUND OF THE INVENTION

The advent of digital television (DTV), the increasing popularity of the Internet, and the introduction of consumer multimedia electronics, such as compact disc (CD) and digital video disc (DVD) players, have made tremendous amounts of multimedia information available to consumers. As video and animated graphics content becomes readily available and products for accessing it reach the consumer market, searching, indexing and identifying large volumes of multimedia data becomes even more challenging and important.

The term "visual animated data" herein refers to natural video, as well as to synthetic 2D or 3D worlds (e.g., VRML), or to a mixture of both video and graphics (e.g., MPEG-4). Different criteria are used to search and index the content of visual animated data, such as a video clip. Video processing systems have been developed for searching frames of visual animated data to detect, identify and label objects of a particular shape or color, or to detect text in the frames, such as subtitles, advertisement text, or background image text, such as a street sign or a "HOTEL" sign.

Presently under development is a new MPEG standard, MPEG-7, which is intended to establish a standard set of "descriptors" that can be used to describe different aspects of visual animated data. The descriptors, or combinations of descriptors and description schemes, directly describe the content of visual animated data, such as a video clip, thereby providing a fast and efficient way to search through an archive of video files and animated graphics files. MPEG-7 is intended to standardize some descriptors and description schemes in a comprehensive description definition language (DDL) to describe the content of visual animated data.

A descriptor, at its most basic, is a representation of an attribute of a feature (or object) in visual animated data. A feature can be something very basic, such as the color of a pixel in a specific frame in a movie, or a feature can be something more conceptual and broad, such as the name of the movie or the age of the character portrayed within the story of the movie. Collections of related descriptors are called description schemes. This language for creating these descriptors and description schemes is called a "description definition language" or DDL.

One goal of MPEG-7 is to allow content creators and content editors to describe any feature of visual animated data content in a manner that can be used by others and can be used for searching and retrieving the visual animated data content by the final consumers. Descriptors are coded so that they can be transmitted and stored efficiently. The MPEG-7 standard, however, is far from completion and many of its intended objectives may never be realized. Additionally, many of the MPEG-7 standard proposals include a full language for creating descriptors. The proposed languages allow a descriptor creator to specify the descriptor in a freeform manner using the syntax and semantics of the specific language. This is a "scriptbased" approach in which each descriptor is a script that can be used whenever a specific feature needs to be described. Under this approach, one descriptor may look nothing like any other descriptor in the DDL. Thus, the descriptors and description schemes that are created may be highly individualized with little commonality according to the choices of the descriptor creator.

There is therefore a need in the art for improved systems and methods for searching and indexing the content of visual animated data including video clips. More particularly, there is a need for a description definition language (DDL) that implements highly structured descriptors and description schemes that are readily recognizable and searchable by parser programs and other applications that detect and analyze descriptor information associated with visual animated data.

SUMMARY OF THE INVENTION

To address the above-discussed deficiencies of the prior art, it is a primary object of the present invention to provide a template containing a standard set of attributes that can be used to describe any feature. Each template comprises a descriptor. A user may describe a feature using a standard template and fill in values to create the descriptor. Using the description definition language to create descriptors, a content creator can describe the lower-level individual features of the multimedia content being created. The content creator can also describe the relationships between these lower level features and collect descriptors into logical groupings using description schemes.

All descriptors and description schemes created in accordance with the principles of the present invention are based on the standard template with some variations. Using a predefined template or set of templates, rather than script-based descriptors, makes the descriptors and description schemes of a visual animated data file easily recognizable and searchable.

Accordingly in one embodiment of the present invention, there is provided a video processing device capable of generating a descriptor data structure representative of a selected feature in a visual animated data file. The video processing device comprises: 1) user input means capable of selecting the selected feature and generating a plurality of attribute values associated with the selected feature; and 2) an image processor capable of identifying the selected feature in the visual animated data file and receiving the plurality of attribute values from the user input means and, in response to receipt of the plurality of attribute values, generating the descriptor data structure by inserting selected ones of the plurality of attribute values into corresponding ones of a plurality of pre-defined attribute fields in a standard descriptor template.

According to one embodiment of the present invention, the image processor is further capable of associating the descriptor data structure with the visual animated data file to thereby produce a modified visual animated data file, wherein the selected feature may be identified in the modified visual animated data file by examining the descriptor data structure.

According to another embodiment of the present invention, the selected feature is an object appearing in the visual animated data file and the descriptor data structure contains attribute values representative of the object.

According to still another embodiment of the present invention, the selected feature is an image frame in the visual animated data file and the descriptor data structure contains attribute values representative of the image frame.

According to yet another embodiment of the present invention, the selected feature is a sequence of image frames in the visual animated data file and the descriptor data structure contains attribute values representative of the sequence of image frames.

According to a further embodiment of the present invention, the descriptor template further comprises a plurality of user-defined attribute fields and wherein the image processor is capable of receiving a plurality of user-defined attribute values from the user input means and inserting selected ones of the plurality of user-defined attribute values in corresponding ones of the user-defined attribute fields.

According to a still further embodiment of the present invention, the plurality of pre-defined attribute fields in a standard descriptor template comprises a unique identification (ID) attribute field, wherein the plurality of pre-defined attribute fields are the same for descriptor data structures having the same ID attribute field.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "processor" or "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video processing system.

Figure 1:
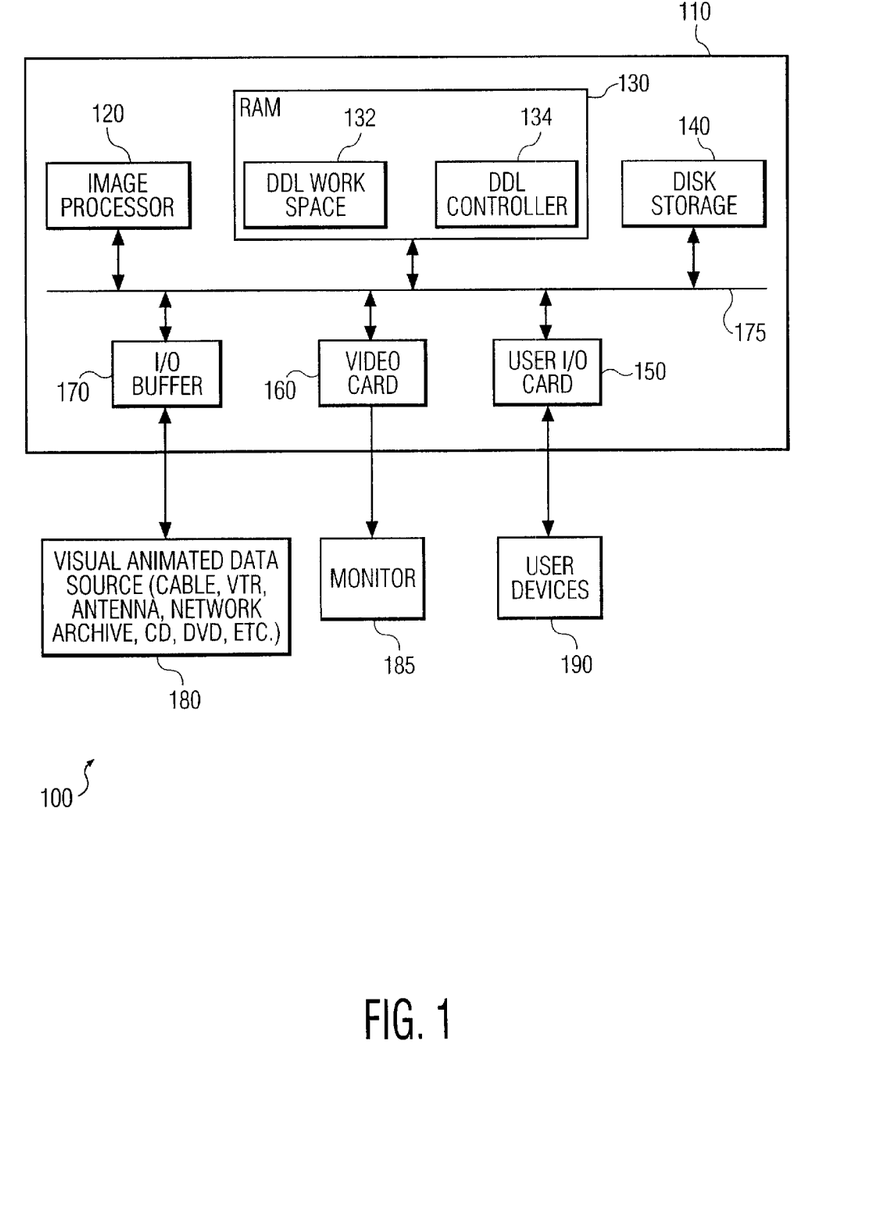
FIG. 1 illustrates an exemplary description definition language (DDL) system in accordance with one embodiment of the present invention.

FIG. 1 illustrates exemplary description definition language (DDL) system 100 in accordance with one embodiment of the present invention. DDL system 100 comprises video processing device 110, visual animated data source 180, monitor 185, and user devices 190.

Video processing device 110-provides the means for a content creator or editor to manually enter descriptors for a video clip (or visual animated data file) using a template of the present invention that incorporates a standard set of attributes that describe features associated with the particular application.

Visual animated data source 180 provides for the transfer of video images to and from video-processing device 110. Visual animated data source 180 may be one or more of a cable, video tape recorder (VTR), antenna, network archive, compact disc (CD) player/recorder, a digital video disc (DVD) player/recorder, removable disk storage, or similar device capable of providing and storing digitized animated video images, with or without audio, and providing and storing digitized audio data without video data. Visual animated data source 180 may have capability for providing a few video clips of short length or for multiple clips, including longer length digitized animated video images. Visual animated data source 180 may provide animated video data in any known format, such as D-1.

Monitor 185 provides the means for display of the animated video image, as well as associated DDL system templates, user selected attributes, and other displays required by the specific application. Monitor 185 may be equipped for audio, as required.

User device(s) 190 represents one or more peripheral devices that may be manipulated by the user of DDL system 100 to provide user inputs for the system. Typical peripheral user input devices include a computer mouse, a keyboard, a lightpen, a joystick, a touch-table and associated stylus, and/or any other device that may selectively be used to enter, to select, and/or to manipulate data, including all or portions of the displayed video image(s). At a minimum, user devices 190 must be capable of providing the means for selecting a DDL template and entering desired system attributes, as required for a particular application. User devices 190 may also include output devices such as a color printer which can be utilized to provide a hard copy of selected DDL template, completed DDL attribute table(s), and/or particular image, frame, or range of frames.

Video processing device 110 comprises image processor 120, RAM 130, disk :storage 140, user I/O card 150, video card 160, I/O buffer 170, and processor bus 175. Processor bus 175 provides the means for data transfer between the various elements of video processing system 110. RAM 130 further comprises description definition language (DDL) work space 132 and description definition language (DDL) controller 134.

Image processor 120 provides over-all control for video processing device 110 and performs the processing required for DDL system 100, including providing templates for DDL descriptor and description schemes attributes and means for entering application data into these templates. This includes implementation of editing processes, processing of digitized animated video images for transfer to monitor 185 or for storage in disk storage 140, and control of data transfer between the various elements of DDL system 100. The requirements and capabilities for image processor 120 are well known in the art and need not be described in greater detail other than as required for the present invention.

RAM 130 provides random access memory (RAM) for temporary storage of data produced by video processing device 110, which is not otherwise provided by components within the system. RAM 130 includes memory for DDL work space 132 and DDL controller 134, as well as other memory required by image processor 120 and associated devices. DDL work space 132 represents the portion of RAM 130 in which video images, DDL templates, and completed tables for descriptors and description schemes associated with a particular video clip(s) are temporarily stored during the process of entering and/or revising selected DDL system attributes. DDL work space 132 provides the means for analyzing and modifying frames and creating descriptor and description scheme tables within a selected video clip without impacting the original data so that the original data can be recovered, as required.

In one embodiment of the invention, DDL controller 134 represents a portion of RAM 130 that is dedicated to storage of an application program executed by image processor 120 to provide DDL templates of the present invention as well as the means for entering, modifying, and storing descriptor and description scheme attributes and attribute values associated with a particular application. DDL controller 134 may interface with well-known editing processes, as well as providing capability for selecting DDL templates and entering/modifying data associated with the selected template(s).

In addition to RAM 130, DDL controller 134 may be embodied as a program on a CD-ROM, computer diskette, or other removable storage media that may be loaded into a removable disk port in disk storage 140 or elsewhere, such as in visual animated data source 180.

Disk storage 140 comprises one or more disk systems, including a removable disk, for permanent storage of programs and other data, including descriptors, description schemes, and/or description definition languages, including the program instructions of DDL controller 134. Disk storage 140 may also have the capability for storing other data, including animated video and audio data. Depending upon system requirements, disk storage 140 is configured to interface with one or more bidirectional buses for the transfer of video (and audio) data to and from visual animated data source(s) 180, as well as the rest of the system. Disk storage 140 is capable of transferring data at video rates, as required. As a minimum, disk storage 140 is sized to provide adequate storage for the program instructions of DDL controller 134 and for data associated with required descriptors and description schemes. Depending upon specific applications and the capability of image processor 120, disk storage 140 may be configured to provide capability for storing a plurality of video clips for viewing and possible modification.

User I/O card 150 provides the means for interfacing user device(s) 190 to the rest of DDL system 100. User I/O card 150 converts data received from user devices 190 to the format of interface bus 175 for transfer to image processor 120 or to RAM 130 for subsequent access by image processor 120. User I/O card 150 also transfers data to user output devices such as printers. Video card 160 provides the interface between monitor 185 and the rest of video processing device 110 through data bus 175. In particular, the interface with the rest of the system occurs through the RAM 130 as controlled by image processor 120.

I/O buffer 170 provides an interface between visual animated data source 180 and the rest of DDL system 100 through bus 175.

As previously discussed, visual animated data source 180 has at least one bidirectional bus for interfacing with I/O buffer 170. I/O buffer 170 is able to transfer data, including signals for transfer of motion descriptor and description schemes and other information of the present invention, to/from visual animated data source 180 at the minimum required video image transfer rate. Internal to video processing device 110, I/O buffer 170 transfers data received from visual animated data source 180 to disk storage 140, to image processor 120, and to RAM 130, as required.

Figure 2:
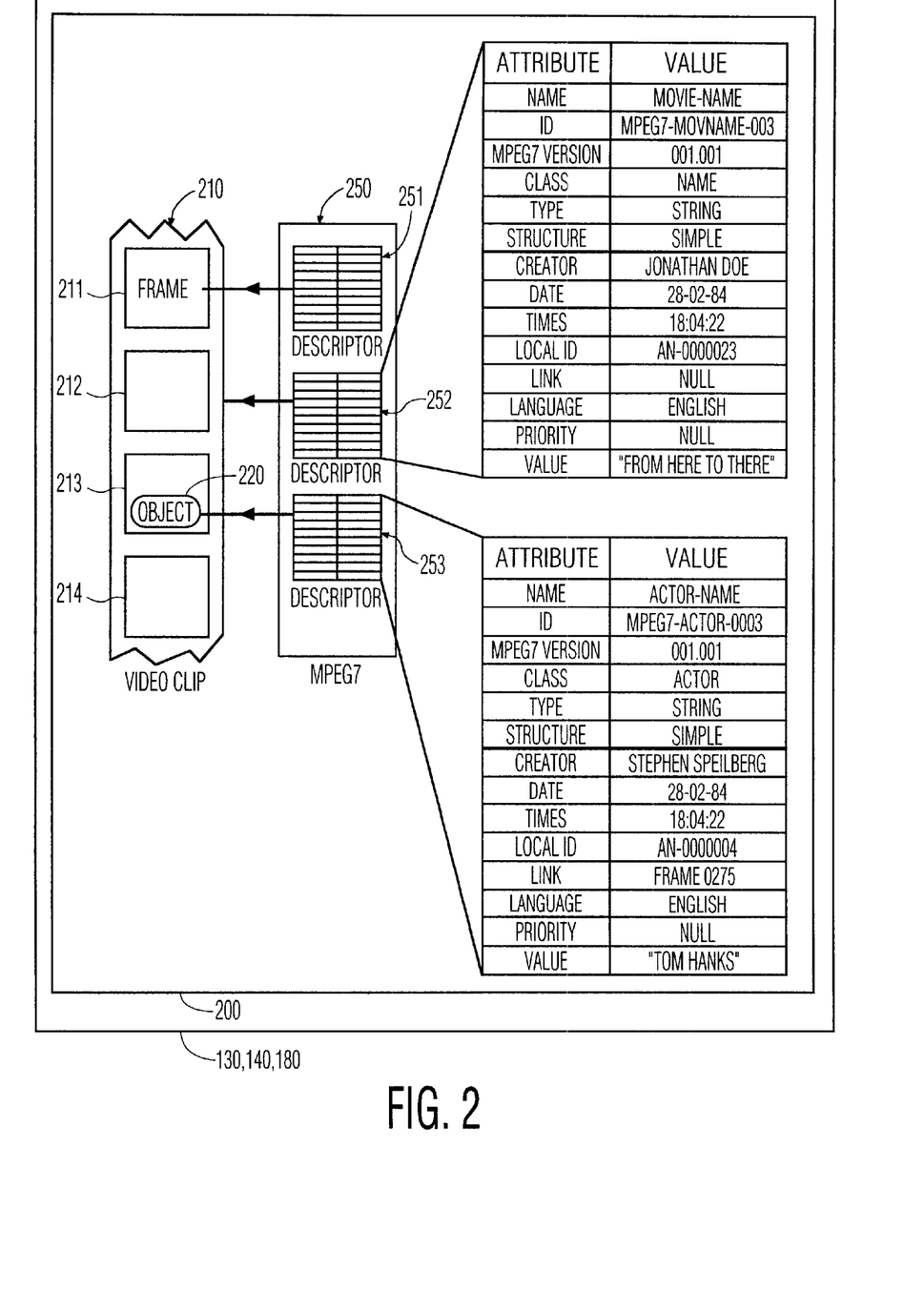
FIG. 2 illustrates an exemplary visual animated data file in accordance with one embodiment of the present invention.

FIG. 2 illustrates exemplary visual animated data file 200 in accordance with one embodiment of the present invention. Visual animated data file 200 comprises video clip file 210 (partially shown) and associated descriptor file 250 (partially shown), which is in MPEG7 format. Visual animated data file 200 may be located in any one of RAM 130, disk storage 140, or visual animated data source 180.

The portion shown of video clip file 210 comprises a sequence of frames 211–214 depicting, among other things, object 220. The portion shown of descriptor file 250 comprises exemplary descriptors 251–253, which are in table form, as explained below in greater detail. Descriptor 251 is associated with and contains information about frame 211 in video clip file 210. Descriptor 252 is associated with and contains information about all of video clip file 210. Descriptor 253 is associated with and contains information about object 220 in frame 213 in video clip file 210.

Figure 3:
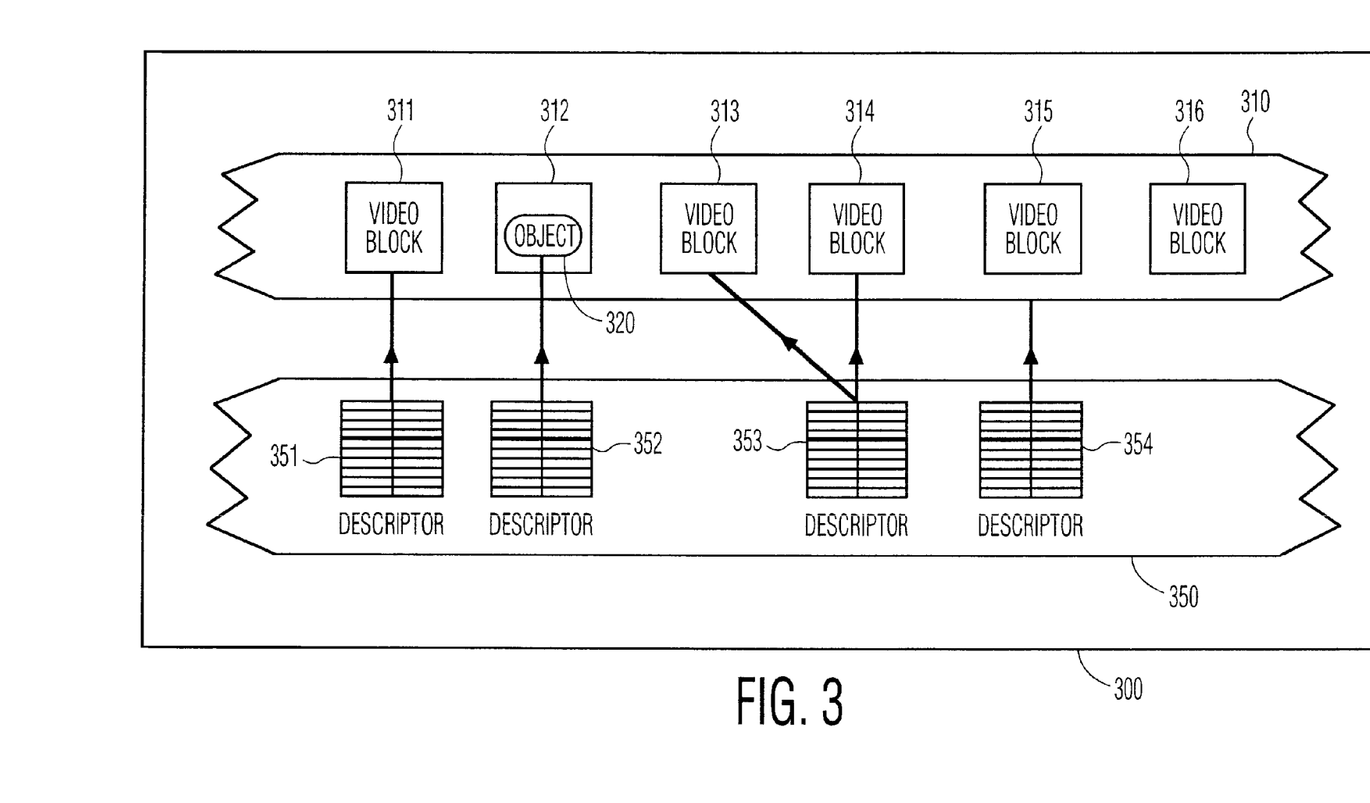
FIG. 3 illustrates an exemplary visual animated data file in accordance with one embodiment of the present invention.

FIG. 3 illustrates exemplary visual animated data file 300 in accordance with one embodiment of the present invention. Visual animated data file 300 comprises video clip file 310 (partially shown) and associated descriptor file 350 (partially shown). In FIG. 3, video clip file 310 and descriptor file 350 are segregated within visual animated data file 300, which may be located in RAM 130, disk storage 140, or visual animated data source 180, or may be a data stream that is transmitted to video processing device 110.

The portion shown of video clip file 310 comprises a sequence of video blocks 311 and 313–316, and frame 312 which depicts, among other things, object 320. The portion shown of descriptor file 350 comprises exemplary descriptors 351–254, which are in table form, as explained below in greater detail. Descriptor 351 is associated with and contains information about video block 311. Descriptor 352 is associated with and contains information about object 320 in frame 312. Descriptor 353 is associated with and contains information about video blocks 313 and 314. Descriptor 354 is associated with and contains information about all of video clip file 310.

Figure 4:
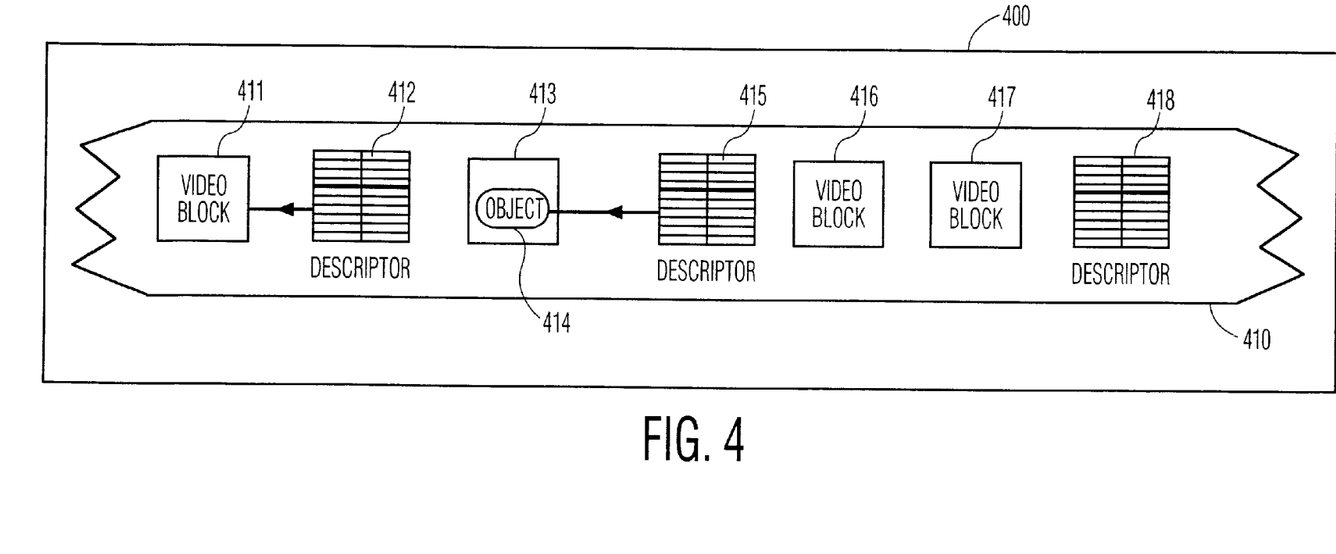
FIG. 4 illustrates an exemplary visual animated data file in accordance with one embodiment of the present invention.

FIG. 4 illustrates exemplary visual animated data file 400 in accordance with one embodiment of the present invention. Visual animated data file 400 comprises video clip file 410 (partially shown), which may be located in RAM 130, disk storage 140, or visual animated data source 180, or may be a data stream that is transmitted to video processing device 110. Visual animated data file 400 is different from visual animated data file 300 in that the descriptors associated with the video blocks, frames and objects in video clip file 410 are an integral part of video clip file 410, rather than being part of a separate descriptor file.

Descriptor 412 is associated with and contains information about video block 411. Descriptor 415 is associated with and contains information about object 414 in frame 413. Video blocks 416 and 417 do not have dedicated descriptors that define their contents. Descriptor 418 is not associated with a particular object, frame or video block and is therefore associated with and contains information about all of video clip file 410.

The present invention provides a flexible method that allows descriptors and description schemes to be defined by standards such as MPEG7, while also allowing user-defined descriptors and description schemes. Since "standard" and user-defined templates of the present invention are identically structured, parser programs, such as DDL controller 134 have no problem working with both template types or resulting descriptors and description schemes. However, an application that understands only standard descriptors' and description themes would be unable to use the user-defined formats.

Video animated data descriptors and description schemes, in accordance with the principles of the present invention, represent a list, file, or table containing a set of attributes and attribute values for either descriptors or description schemes. In order to simplify the development of descriptor and description schemes for video animated data, general descriptor and general description scheme templates of the present invention are configured with attributes specific to video applications. Each general template is converted to a specific template by incorporating a partial group of fixed values, known as elemental values, into a copy of the applicable general template. A specific descriptor or description scheme is then derived by inserting user-defined values related to a specific video scene into a copy of the applicable general template.

Table 1 illustrates an exemplary general video descriptor template D1. General video descriptor template D1 has a non-exhaustive set of predefined attributes which may be used when creating video descriptors. The attributes listed in descriptor template D1 are not meant to be an exhaustive listing of elemental attributes for an MPEG7 descriptor or any other type of descriptor associated with visual animated data. In a real world environment, the full set of attributes may be considerably larger than the exemplary set outlined in descriptor template D1.

TABLE 1

High-Level View of Descriptor Template D1

| Attribute | Value |
|---|---|
| Name | |
| ID | |
| MPEG7 | |
| Version | |
| Class | |
| Type | |
| Structure | |
| Creator | |
| Date | |
| Time | |
| Local ID | |
| Link | |
| Language | |
| Priority | |
| Value | |

The double line between the Structure and Creator attributes in D1 separates the general descriptor template into categories of elemental and user-defined values. Elemental values appear above the double line and user-defined values appear below the double line. Since D1 represents a general descriptor template, no values are assigned for the attributes. When implemented, selected values may be represented by basic (simple) data types or complex data types, depending upon the described attribute. Simple values encompass a single piece of data (i.e. characters, integers, floating point or string) while complex values encompass multiple pieces of data (i.e. array, histogram, or list).

When image processor 110 converts general template D1 to a specific descriptor template, elemental values are inserted, ensuring that each use of the resulting specific descriptor template produces a descriptor which has a format and core of required information that corresponds to similarly created descriptors.

Attributes for D1 are representative of appropriate descriptor attributes for video animated data. The Name attribute is a unique label identifying the specific descriptor using one or two descriptive keywords. The ID attribute is a globally unique identifier for the descriptor. For example, in one embodiment of the present invention, all MPEG7 descriptors have an ID attribute="MPEG7 " as the start of the ID attribute. The MPEG7 Version attribute indicates the latest revision of the MPEG7 standard that general descriptor template D1 supports. Class attribute provides for the collection or grouping of descriptors into distinct classes that can be used for indexing and searching. The Type attribute indicates the data type of user-defined values. The Structure attribute indicates whether the Type attribute is simple or complex.

The remaining attributes identify values which are to be supplied by the user when creating a specific descriptor. The Creator attribute describes the user who defined the specific descriptor. The Date and Time attribute represent the date and time the specific descriptor was created. Local ID is a unique ID for the specific descriptor. Local ID may be used as a reference identifier for the particular descriptor. The Link attribute contains a link to the source data this descriptor describes. The Language attribute indicates the language of the source material. The Priority attribute may indicate a level of confidence or of reliability. It can be used to support the prioritization of features to speed querying. Finally, the Value attribute contains the actual value of the descriptor. This value must be of the type referenced in the Type attribute.

Table 2 illustrates an exemplary specific MPEG7 descriptor template D2, which identifies the name of an actor (actor-name). As discussed, image processor 110 creates a specific template by inserting MPEG7 elemental values into a copy of the general descriptor template D1.

TABLE 2

MPEG7 Descriptor Template D2

| Attribute | Value |
| --- | --- |
| Name | Actor-Name |
| ID | MPEG7-Actor-0003 |
| MPEG7 Version | 001.001 |
| Class | Actor |
| Type | String |
| Structure | Simple |
| Creator | |
| Date | |
| Time | |
| Local ID | |
| Link | |
| Language | |
| Priority | |
| Value | |

In this case, D2 is an MPEG7-actor descriptor template which may be utilized whenever a frame, scene, or other application needs to be associated with a particular actor.

Table 3 illustrates exemplary user-defined general descriptor template D3, which describes an actor's age.

TABLE 3

User-Defined Descriptor Template D3

| Attribute | Value |
| --- | --- |
| Name | Actor-Age |
| ID | Philips-Act-Age-0001 |
| MPEG7 Version | 001.001 |
| Class | Actor |
| Type | Integer |
| Structure | Simple |
| Creator | |
| Date | |
| Time | |
| Local ID | |
| Link | |
| Language | |
| Priority | |
| Value | |

As shown by the ID elemental value, D3 is not MPEG7 approved, but it may be used and transmitted with MPEG7 files or data streams since it follows the form of the previously discussed MPEG7 general template. D3 may also be used by other applications that are aware of its structure and meaning.

Table 4 illustrates descriptor D4 which represents a descriptor based on a specific MPEG7 descriptor template.

TABLE 4

Descriptor D4

| Attribute | Value |
| --- | --- |
| Name | Actor-Name |
| ID | MPEG7-Actor-0003 |
| MPEG7 Version | 001.001 |
| Class | Actor |
| Type | String |
| Structure | Simple |
| Creator | Stephen Spieiberg |
| Date | 28-02-84 |
| Time | 18:04:22 |
| Local ID | AN-0000004 |
| Link | Frame 0275 |
| Language | English |
| Priority | Null |
| Value | "Tom Hanks" |

In this case, image processing device 110 has inserted user-defined values for a specific scene into a copy of MPEG7 actor-name template D2. The resultant actor-name descriptor D4 provides the name of the actor who appears in a specific frame in a scene. As shown, descriptor D4 has values for all user-defined components of D2. Descriptor D4 is linked to a specific frame in the source data with a Local ID that can be used to reference this specific descriptor, if necessary.

Video processing device 110 comprises similar processes for the creation and use of video animated data templates for description schemes, which may also be based on particular standards (i.e. MPEG7) or user-defined. A description scheme may be considered as an "umbrella descriptor" for a collection of related descriptors. In particular, it documents the relationship between these related descriptors or "children".

Table 5 illustrates exemplary general description scheme template DS5, which comprises a non-exhaustive set of potential attributes for a finalized description scheme.

TABLE 5

Description Scheme Template DS5

| Attribute | Value |
| --- | --- |
| Name | |
| ID | |
| MPEG7 Version | |
| Class | |
| Creator | |
| Date | |
| Time | |
| Local ID | |
| Link | |
| Language | |
| Priority | |
| Children | |

As in the case of descriptor templates, the double line in the table separates the elemental values from user-defined values. Further, no values are present in DS5 since DS5 is representative of a general description scheme template. The attribute/value which primarily delineates a description scheme template from a descriptor template is reflected in the last entry which is labeled "Children". Further, except for the Children attribute/value, prior discussions for similarly named descriptor and descriptor template attributes apply to description schemes and description scheme template attributes.

The value for the Children attribute comprises any combination of one or more descriptors or description schemes (known as children) that are described by the completely characterized description scheme. The children value may have relationship groupings embedded with the descriptors and description schemes. For example, several descriptors that are children of a particular description scheme may have an inherent ordering. By documenting the ordering relationship in the description scheme, image processor 110 provides the means for linking these descriptors together. Any application reading this set of ordered descriptors should have the means for correctly establishing the required order.

Video processing device 110 provides for several different types of relationships among children in a description scheme. The set of relationship types includes order, equivalence, peer, and physical. An order relationship indicates that the sequential value order of the children has meaning. In other words, the children values are presented in the order in which they occur. An equivalence relationship indicates that all of the children are different representations of the same thing. For example, the same paragraph of text appears in three different languages. The content of the paragraph is the same, only the language is different. A peer relationship indicates that the children are related to each other as equals. For example, a set of audio tracks that represent the soundtrack for a video scene are peers. A physical relationship indicates that the children have a common physical connection. For example, a book object and a table object that are physically touching in a video frame have a physical relationship.

Video processing device 110 saves resultant general description scheme template DS5 for use in developing more specific description scheme template(s) and final description schemes, in manner to that as described for descriptor templates.

An MPEG7-defined description scheme template is derived from the general description scheme template, by setting the elemental values to values defined by the MPEG7-standard. The resultant MPEG7-description scheme template will serve as basis for defining all MPEG7 description schemes.

Table 6 illustrates exemplary specific description scheme template DS6, which is used when describing a video scene.

TABLE 6

MPEG7 Description
Scheme Template DS6

| Attribute | Value |
|---|---|
| Name | Scene |
| ID | MPEG-Scene-003 |
| MPEG7 Version | 001.001 |
| Class | Video-Component |
| Creator | |
| Date | |
| Time | |
| Local ID | |
| Link | |
| Language | |
| Priority | |
| Children | |

As required, video processing device 110 determines and inserts elemental values related to the specific MPEG7-scene into a copy of the example DS6 general description scheme template to produce an MPEG-scene description scheme relevant to the selected source data. The resultant MPEG7-scene description scheme template may then be utilized a plurality of times for the creation of specific scene-based description schemes.

As in the case of descriptor templates, the MPEG7 attribute is uniquely defined by the MPEG7 standard and will only be applicable for systems and description schemes compatible with MPEG7 formats.

Table 7 illustrates exemplary description scheme template DS7, which provides a user-defined description scheme template for camera motion.

TABLE 7

User-Defined Description
Scheme Template DS7

| Attribute | Value |
|---|---|
| Name | Camera Motion |
| ID | Philips-Camera-003 |
| MPEG7 Version | 001.001 |
| Class | Video-Component |
| Creator | |
| Date | |
| Time | |
| Local ID | |
| Link | |
| Language | |
| Priority | |
| Children | |

This user-defined general description scheme template does not have an MPEG7 approved ID, but it can be used and transmitted with MPEG7 files or streams and used by applications aware of this particular user-defined description scheme.

Table 8 illustrates exemplary description scheme DS8, which describes a specific scene in an MPEG-compatible video stream.

TABLE 8

Description Scheme DS8

| Attribute | Value |
|---|---|
| Name | Scene |
| ID | MPEG-Scene-003 |
| MPEG7 Version | 001.001 |
| Class | Video-Component |
| Creator | John Smith |
| Date | 27-July-1998 |
| Time | 12:23:01 |
| Local ID | 000001 |
| Link | Null |
| Language | English |
| Priority | Null |
| Children | D1, DS1, O(D2, D4) |

DS8 is based on the MPEG-scene description scene template DS6. As shown by the null value for the Link attribute, this description scheme is not linked to any specific frame in the source data. Its connection to the source data is through the descriptors and description schemes that are represented by Children values. The Local ID provides a reference for this particular description scheme. As in the case of descriptors, multiple appearances of a particular description scheme are required when the identified scene appears a plurality of times in the video. In other words, DS8 may be used one or more times in the MPEG7 file or VAD stream to refer to the named video scene.

This particular description scheme has 4 children, descriptor 1 (D1), description scheme 1 (DS1), descriptor 2

(D2) and descriptor 4 (D4). Three are descriptors and one is a description scheme which may also have children. These four children comprise the description scheme instance. These children, and any of their children, are also part of the description scheme instance. Two of the children (D2 and D4) of this description scheme instance are related, as indicated the preceding letter O and parenthesis. The letter O indicates an ordering relationship, meaning D2 and D4 occur in the order they appear. The order has significance when interpreting these two descriptors in this description scheme.

Video processing device 110 may also identify hierarchy relationships for description schemes. This is accomplished with a children value which has one or more descriptor scheme children which variously have one or more description-scheme-children with description scheme children. This hierarchy capability provides useful information and is an important part of the description scheme.

Figure 5:
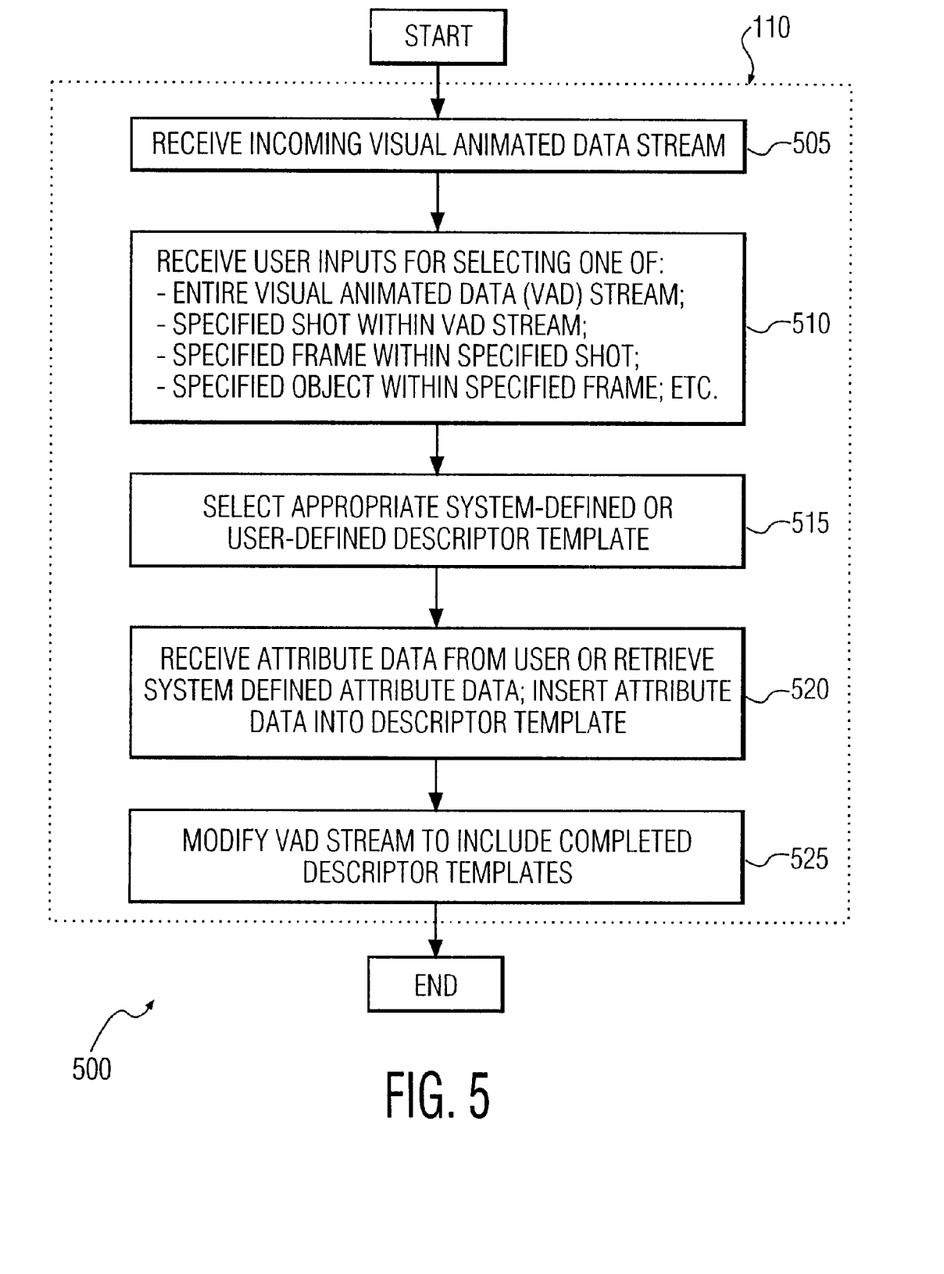
FIG. 5 illustrates an exemplary flow diagram delineating a method of generating descriptors in video processing system in accordance with one embodiment of the present invention.

FIG. 5 illustrates an exemplary flow diagram (generally designated 500) delineating a method of generating descriptors in video processing device 110 using DDL controller 134, in accordance with one embodiment of the present invention.

Video processing device 110 retrieves a visual animated data (VAD) stream from VAD source 180 and stores the VAD in disk storage 140 and DDL work space 132 (process step 505). Video processing device 110 also receives user inputs which identify the VAD requiring a video descriptor. The user may select all of the stored VAD stream, a particular shot within the stream, a particular frame of a particular shot, a specific object of a frame, etc for descriptor processing (process step 510).

Using DDL controller 134, video processing device 110 examines DDL work space 132 to determine which system-defined or user-defined descriptor template is required (process step 515). A copy of the required template with defined attributes and elemental values is retrieved and placed in DDL work space 132 for modification. Video processing device 110 retrieves required user-defined attribute values and stores them in applicable data fields of the stored copy of the descriptor template. Image processor 120 stores the resultant descriptor in DDL work space 132 (process step 520). Video processing device 110 subsequently modifies the stored VAD to include the finalized descriptor and transfers the resultant VAD as an enhanced VAD data stream, as required (process step 525).

Although the present invention has been described in detail, those skilled in the art should understand that they can make various changes, substitutions and alterations herein without departing from the spirit and scope of the invention in its broadest form.

What is claimed is:

1. A video processing device for generating a descriptor data structure representative of a selected feature in a visual animated data file that has been selected from among a plurality of features comprising visual, conceptual, textual and graphical features, said video processing device comprising:

user input means for selecting said selected feature from among said plurality of features and for generating a plurality of attribute values associated with said selected feature; and an image processor that identifies said selected feature in said visual animated data file and receives said plurality of attribute values from said user input means and, in response to receipt of said plurality of attribute values, said image processor generates said descriptor data structure by inserting selected ones of said plurality of attribute values into corresponding ones of a plurality of pre-defined attribute fields in a standard descriptor template, wherein said standard descriptor template has fields for receiving attribute values for description of all of the plurality of visual, conceptual, textual and graphical features that are selectable by said user input means; and wherein said plurality of pre-defined attribute fields in a standard descriptor template comprises a unique identification (ID) attribute field, wherein said plurality of pre-defined attribute fields are the same for descriptor data structures having the same ID attribute field.

2. The video processing device set forth in claim 1 wherein said image processor is further capable of associating said descriptor data structure with said visual animated data file to thereby produce a modified visual animated data file, wherein said selected feature may be identified in said modified visual animated data file by examining said descriptor data structure.

3. The video processing device set forth in claim 1 wherein said selected feature is an object appearing in said visual animated data file and said descriptor data structure contains attribute values representative of said object.

4. The video processing device set forth in claim 1 wherein said selected feature is an image frame in said visual animated data file and said descriptor data structure contains attribute values representative of said image frame.

5. The video processing device set forth in claim 1 wherein said selected feature is a sequence of image frames in said visual animated data file and said descriptor data structure contains attribute values representative of said sequence of image frames.

6. The video processing device set forth in claim 1 wherein said descriptor template further comprises a plurality of user-defined attribute fields and wherein said image processor is capable of receiving a plurality of user-defined attribute values from said user input means and inserting selected ones of said plurality of user-defined attribute values in corresponding ones of said user-defined attribute fields.

7. For use in a video processing device, a method of generating a descriptor data structure representative of a selected feature in a visual animated data file that has been selected from among a plurality of features comprising visual, conceptual, textual and graphical features, the method comprising the steps of:

selecting the selected feature from among said plurality of features using a user input means;

receiving a plurality of attribute values associated with the selected feature from the user-input means; and identifying the selected feature in the visual animated data file and, in response to receipt of the plurality of attribute values, generating the descriptor data structure by inserting selected ones of the plurality of attribute values into corresponding ones of a plurality of pre-define attribute fields in a standard descriptor template, wherein the standard descriptor template comprises fields for receiving attribute values for the selected ones of the plurality of attribute values from all of the plurality of visual, conceptual, textual and graphical features that are selectable by the user input means; and wherein the plurality of pre-defined attribute fields in said standard descriptor template comprises a unique identification (ID) attribute field, wherein the plurality of pre-defined attribute fields are the same for descriptor data structures having the same ID attribute field.

8. The method set forth in claim 7 including the further step of associating the descriptor data structure with the visual animated data file to thereby produce a modified visual animated data file, wherein the selected feature may be identified in the modified visual animated data file by examining the descriptor data structure.

9. The method set forth in claim 7 wherein the selected feature is an object appearing in the visual animated data file and the descriptor data structure contains attribute values representative of the object.

10. The method set forth in claim 7 wherein the selected feature is an image frame in the visual animated data file and the descriptor data structure contains attribute values representative of the image frame.

11. The method set forth in claim 7 wherein the selected feature is a sequence of image frames in the visual animated data file and the descriptor data structure contains attribute values representative of the sequence of image frames.

12. The method set forth in claim 7 wherein the descriptor template further comprises a plurality of user-defined attribute fields and including the further steps of receiving a plurality of user-defined attribute values from the user input means and inserting selected ones of the plurality of user-defined attribute values in corresponding ones of the user-defined attribute fields.

13. A computer processable visual animated data filed stored on a computer readable storage medium comprising:
    a sequence of visual animated data frames; and
    a descriptor data structure representative of a selected feature of said sequence of visual animated data frames that has been selected from among a plurality of features comprising visual, conceptual, textual and graphical features, said descriptor data structure comprising a standard descriptor template containing a first plurality of pre-defined attribute fields associated with said selected feature and a second plurality of user-defined attribute fields associated with said selected feature, so that the standard descriptor template can receive attribute values associated with any of the visual, conceptual, textual and graphical features; and
    wherein said first plurality of pre-defined attribute fields in said standard descriptor template comprises a unique identification (ID) attribute field, wherein said first plurality of pre-defined attribute fields are the same for descriptor data structures having the same ID attribute field.

14. The computer processable visual animated data file stored on a computer readable storage medium as set forth in claim 13 wherein said descriptor data structure is associated with said sequence of visual animated data frames such that said selected feature may be identified in said sequence of visual animated data frames by examining said descriptor data structure.

15. The computer processable visual animated data file stored on a computer readable storage medium set forth in claim 13 wherein said selected feature is an object appearing in said sequence of visual animated data frames and said descriptor data structure contains attribute values representative of said object.

16. The computer processable visual animated data file stored on a computer readable storage medium set forth in claim 13 wherein said selected feature is a selected one of said sequence of visual animated data frames and said descriptor data structure contains attribute values representative of said selected visual animated data frame.

17. The computer processable visual animated data file stored on a computer readable storage medium set forth in claim 13 wherein said selected feature is a plurality of said sequence of visual animated data frames and said descriptor data structure contains attribute values representative of said plurality of said sequence of visual animated data frames.

\* \* \* \* \*